Oct. 11, 1927.
B. A. PETERSON
1,644,946
WINDER
Original Filed April 30, 1923    6 Sheets-Sheet 3
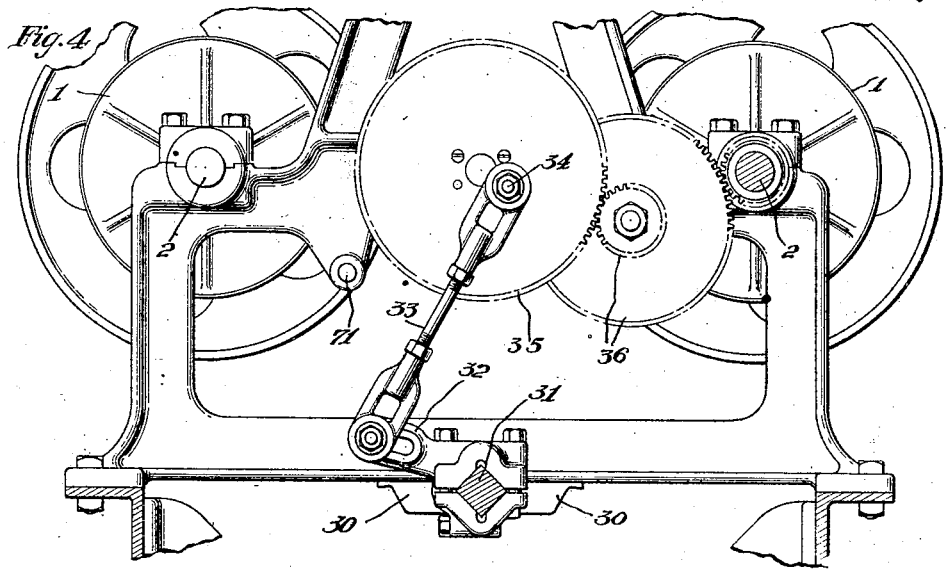
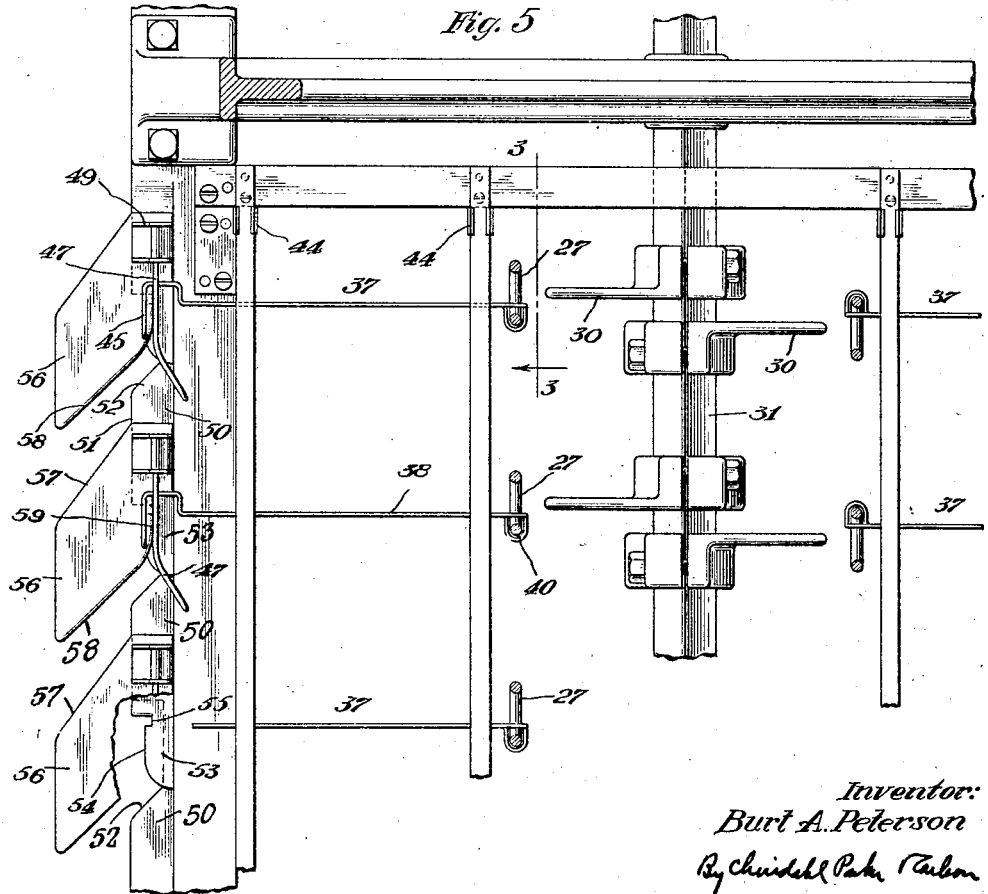
Inventor:
Burt A. Peterson Oct. 11, 1927.
B. A. PETERSON
WINDER
Original Filed April 30, 1923   6 Sheets-Sheet 4
1,644,946
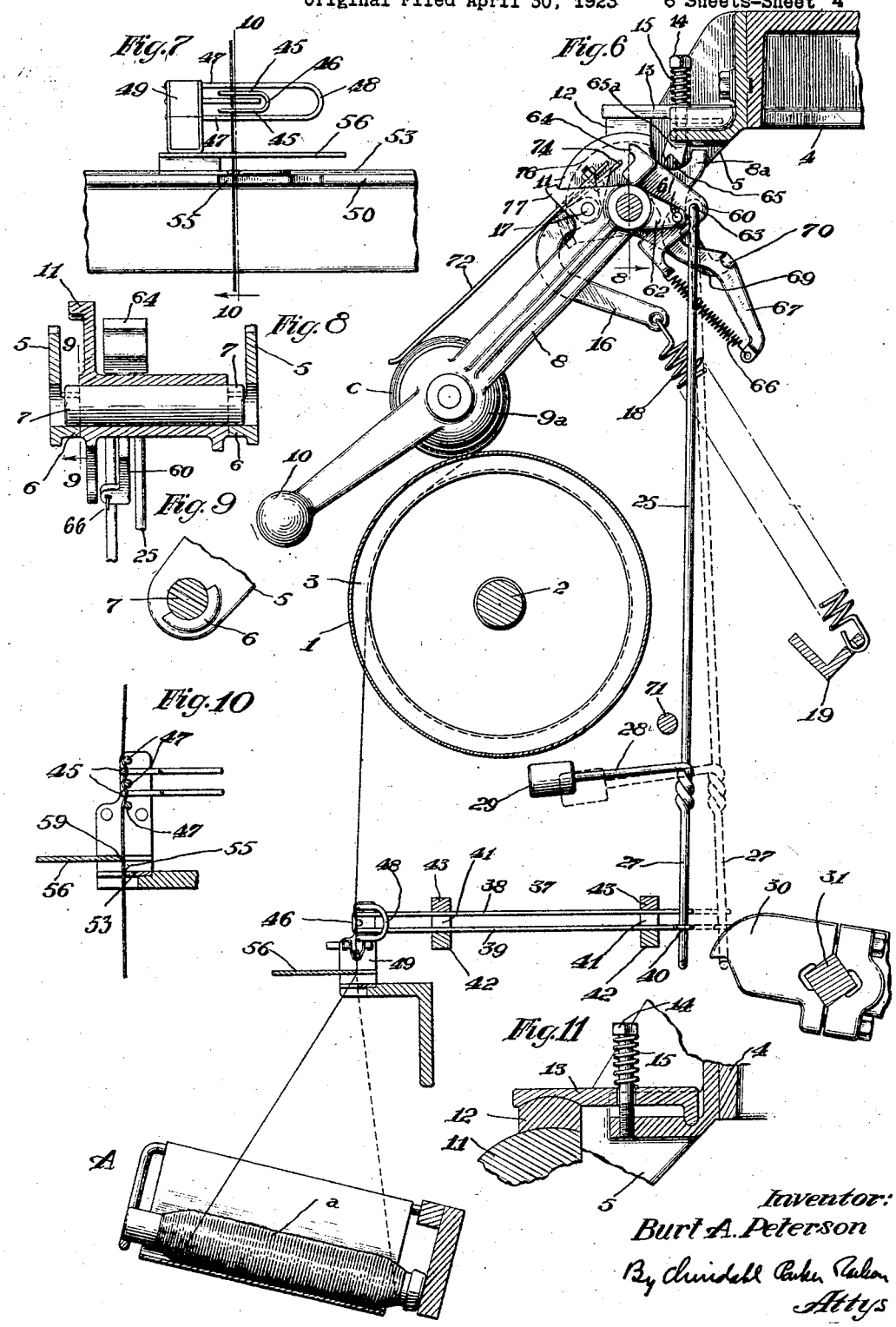
Inventor:
Burt A. Peterson

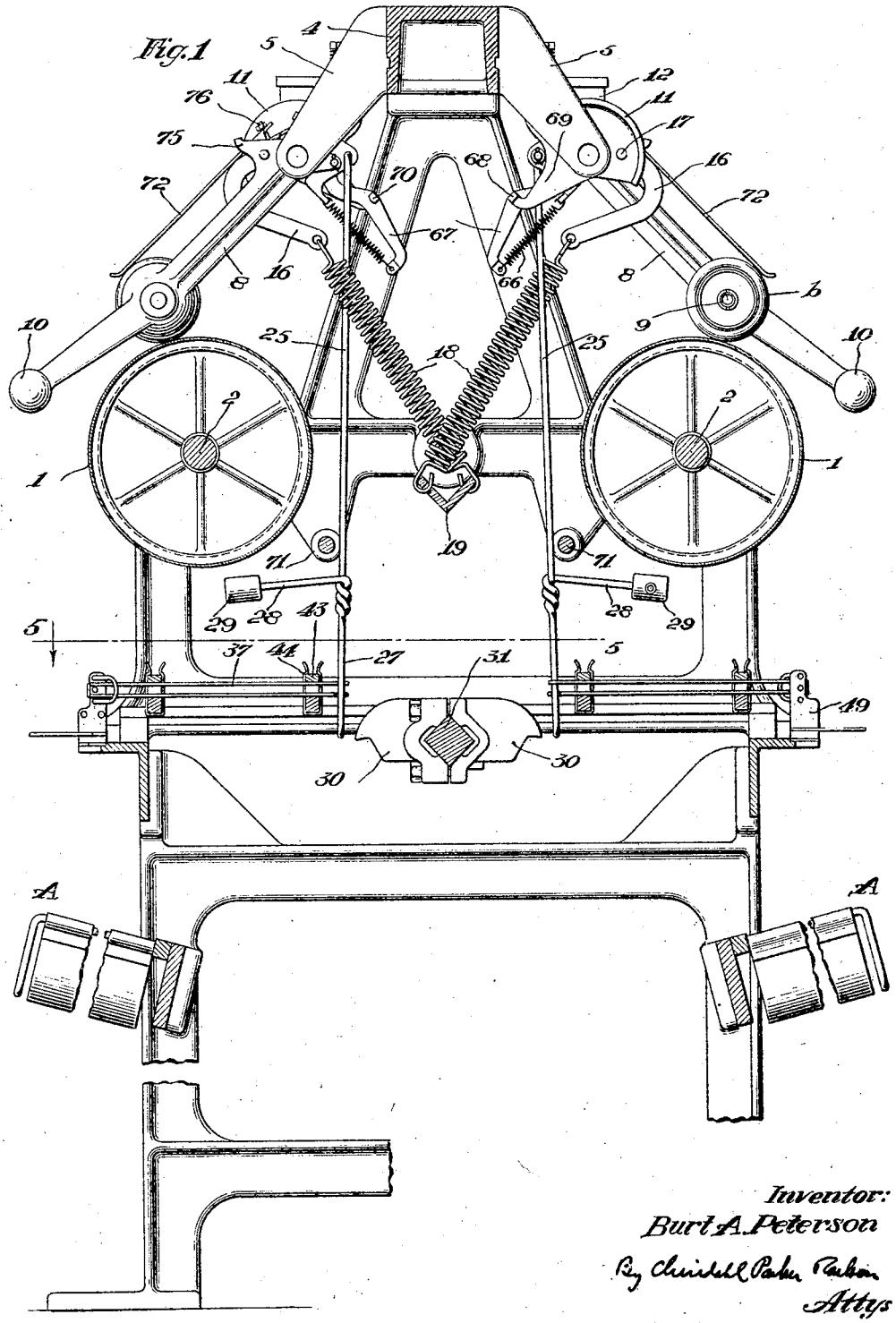

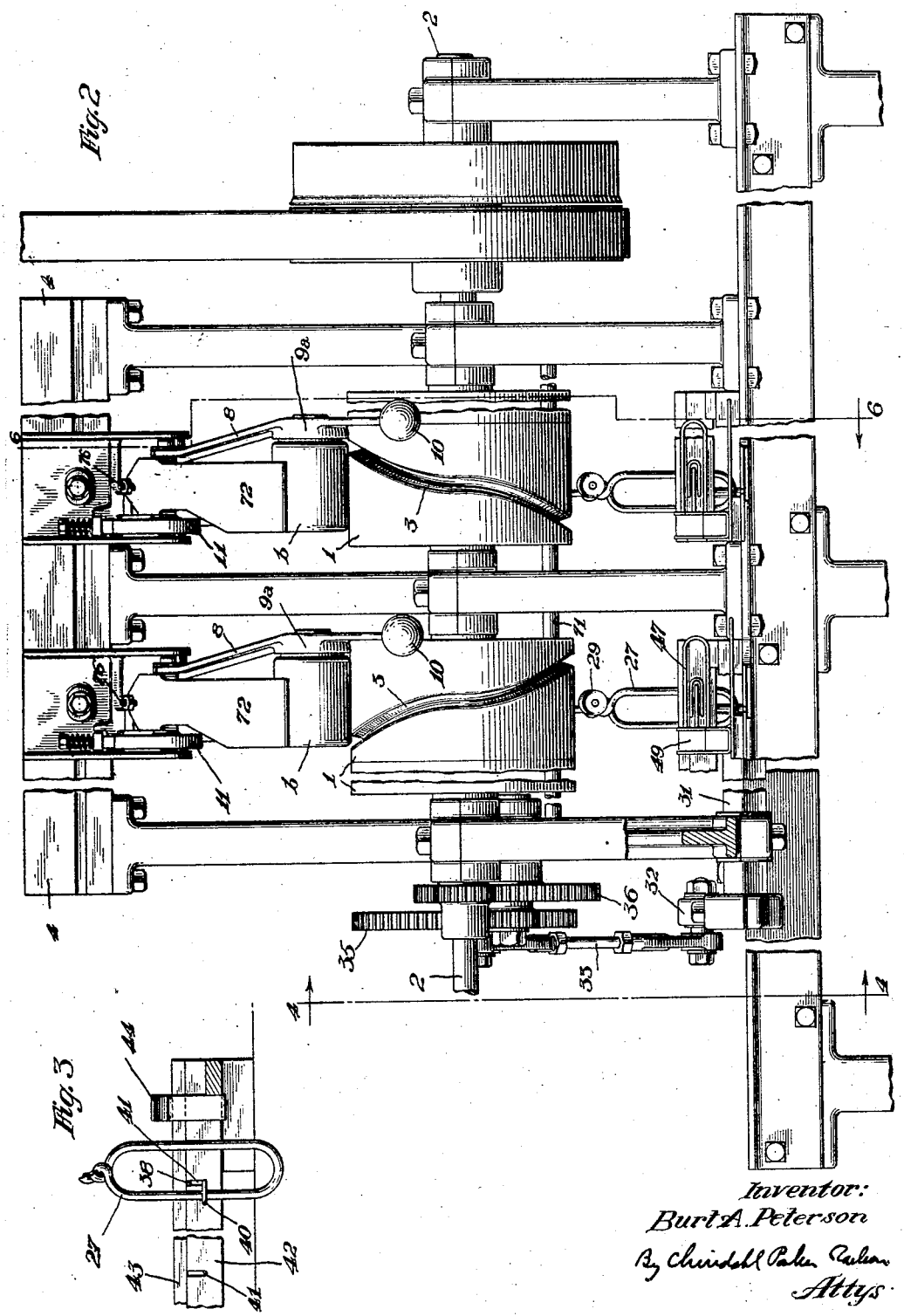

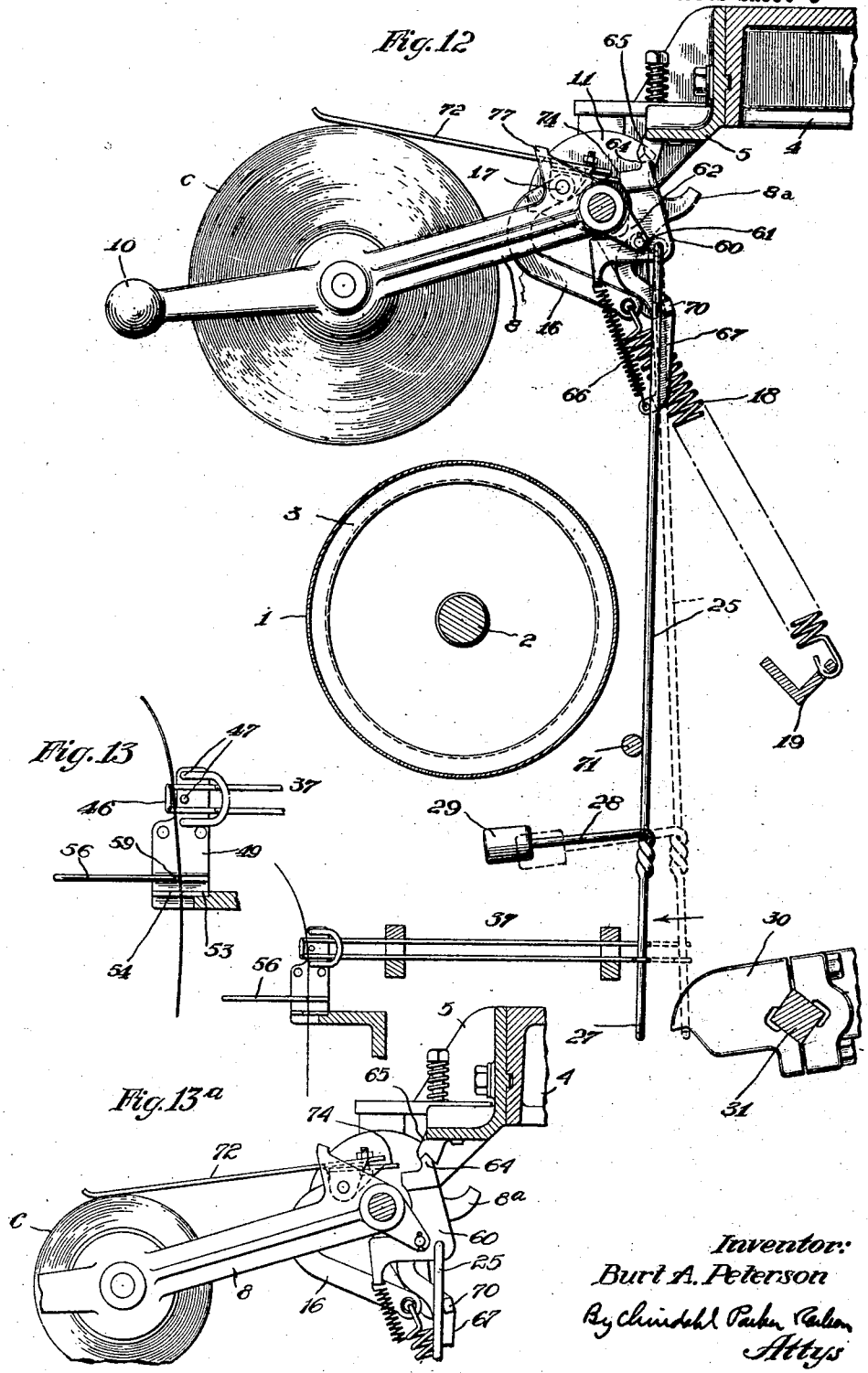

Oct. 11, 1927.  1,644,946
B. A. PETERSON
WINDER
Original Filed April 30, 1923   6 Sheets-Sheet 6
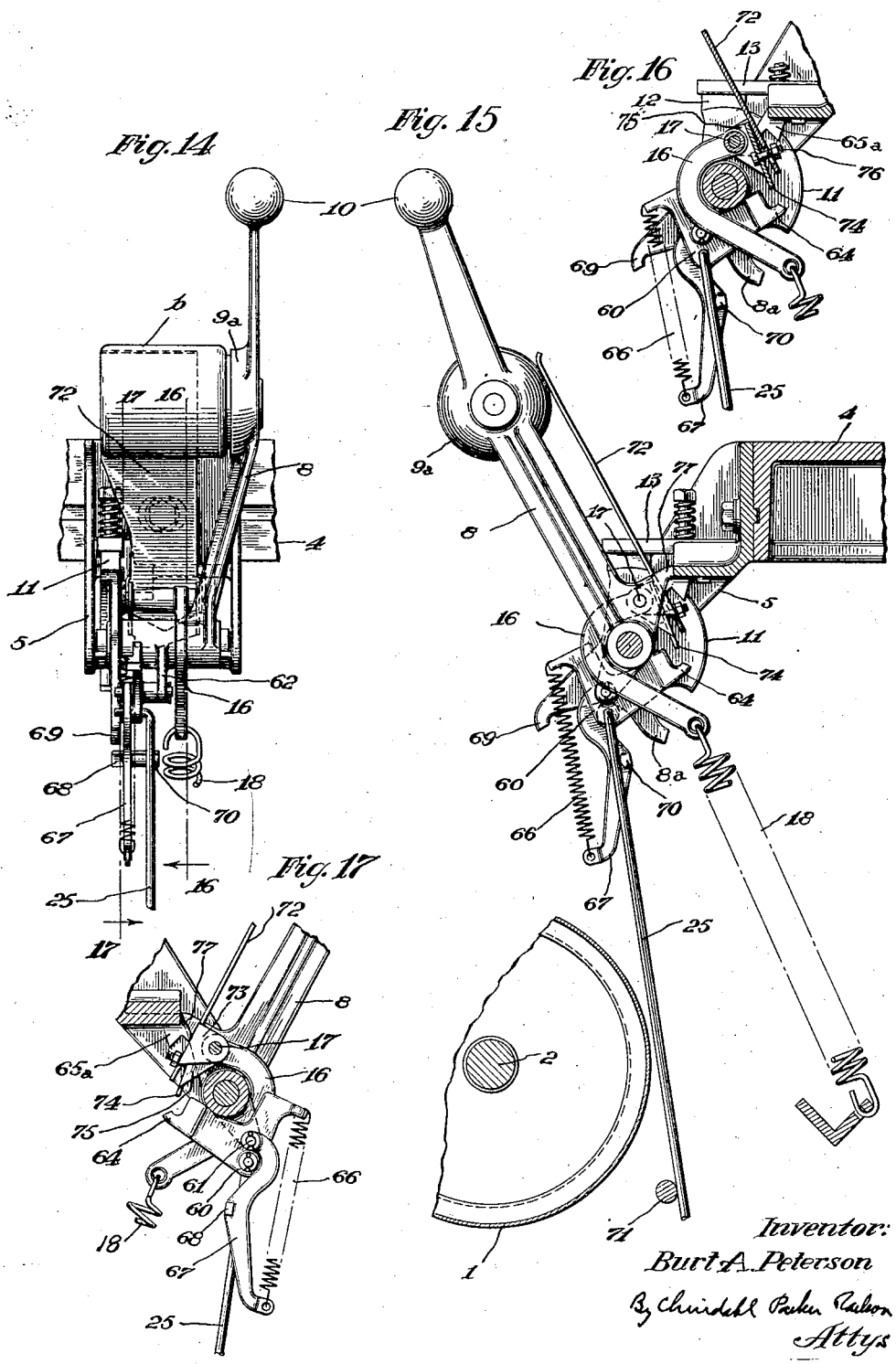

Patented Oct. 11, 1927.

1,644,946

UNITED STATES PATENT OFFICE.

BURT A. PETERSON, OF ROCKFORD, ILLINOIS, ASSIGNOR TO BARBER-COLMAN COMPANY, OF ROCKFORD, ILLINOIS, A CORPORATION OF ILLINOIS.

WINDER.

Application filed April 30, 1923, Serial No. 635,545. Renewed January 7, 1927.

In some respects the object of the present invention is to simplify, cheapen and render more efficient the winder disclosed in the Colman Patent No. 1,311,498, dated July 29, 1919. To this end, the means for supporting the cheese has been rearranged so as to render the cheese more convenient of access to the operator; the necessity for using the dash pot shown in the Colman patent has been obviated; the means for preventing the return of a full cheese to winding position has been simplified; and the means for preventing the formation of an eccentric cheese has been rendered more reliable. Various other improvements will become apparent as the description proceeds.

In the accompanying drawings, Figure 1 is a transverse vertical sectional view of a winder embodying the features of my invention. Fig. 2 is a fragmental side elevation of the winder, the parts being broken away to shorten the view. Fig. 3 is a view taken in the plane of line 3—3 of Fig. 5. Fig. 4 is a view taken from the left hand end of Fig. 2, in the plane of line 4—4. Fig. 5 is a fragmental horizontal view taken in the plane of line 5—5 of Fig. 1. Fig. 6 is a fragmental transverse sectional view showing one of the winding units in operation. Fig. 7 is a front view of the detector and thread-guiding means. Fig. 8 is a section in the plane of line 8 of Fig. 6. Fig. 9 is a section in the plane of line 9—9 of Fig. 8. Fig. 10 is a view taken in the plane of line 10—10 of Fig. 7, showing the detector and thread guides. Fig. 11 illustrates the means for preventing the formation of an eccentric yarn mass. Fig. 12 represents a winding unit which has been thrown out of operation, the view indicating how a full cheese prevents restoration of the unit to winding position. Fig. 13 illustrates the detector in position to receive a new thread. Fig. 13ᵃ is a fragmental view showing in thrown-out position a cheese which has not attained full size. Fig. 14 is a fragmental front view of a unit which has been withdrawn from service. Fig. 15 is a side elevation of the parts shown in Fig. 14. Fig. 16 is a detail view of some of the parts shown in Fig. 15. Fig. 17 is a fragmental view looking from the side opposite to that shown in Fig. 15.

The embodiment herein shown of this invention consists of a plurality of winding units arranged at opposite sides of an elongated framework. Each winding unit is adapted to rewind yarn from a supply yarn mass $a$ (Fig. 6) onto a tubular yarn carrier $b$ (Fig. 1) to form a cylindrical cross-wound yarn mass or cheese $c$ (Fig. 12). The supply yarn mass $a$ is herein shown as being a warp bobbin, but the present invention may be used in rewinding yarn from various other forms of yarn masses.

The bobbin $a$ may be supported in any preferred manner. For example, it may be non-rotatably supported for the drawing of the yarn off the tip of the bobbin, or it may be rotatably supported for the unwinding of the yarn from the side of the bobbin. Herein is shown a bobbin-holder A which is substantially similar to the bobbin-holder shown in my Patent No. 1,045,879, dated December 3, 1912.

The yarn carrier $b$ may be and preferably is similar to the one fully described in application Serial No. 500,512, filed September 14, 1921, by Howard D. Colman.

The cheese is rotated through peripheral contact with a drum 1 fixed upon a shaft 2 which is continuously driven at high speed. The drum 1 is provided with a peripheral cam groove 3. When the cheese is in peripheral contact with the drum 1, the cheese is rotated and the yarn is rapidly traversed or guided back and forth.

The means for supporting the yarn carrier $b$ is preferably arranged rearwardly of the yarn mass so as not to be between the operative and the yarn mass. In the construction herein shown, the main framework of the machine comprises a beam 4 located in the longitudinal central plane of the machine and above the cam drums 1. Each winding unit comprises a bracket 5 rigidly secured to the beam 4 and extending forwardly and downwardly therefrom. At the lower end of the bracket 5 are two sockets 6 (Fig. 8) extending toward each other and serving to support the trunnions or pivots 7 of a cheese-supporting lever or arm 8. Projecting from the left-hand side of the arm 8 is a pivot 9 (Fig. 1) upon which the yarn carrier $b$ may be mounted in the manner fully described in said application Serial No. 500,512. On the cheese arm 8 is a flange 9ᵃ (Figs. 2 and 6) concentric with the pivot 9 and coacting with a portion of the yarn carrier $b$ to prevent yarn from being wound about said pivot. To prevent the flange 9ᵃ from being dropped on the drum 2 when there is no yarn carrier on the pivot 9, I provide a stop lug 8ª (Fig. 6) on the cheese arm adapted to engage a stop surface on the bracket 5. The arm 8 projects forwardly and downwardly past the pivot 9 and is provided at its free end with a handle 10. As clearly shown in Fig. 2, the arm 8 is so located as to support the cheese in proper relation to the cam groove 3 of the drum 1.

Means is preferably provided to prevent the formation of an eccentric yarn mass on the carrier b. While such eccentricity-preventing means may be of any desired character, that herein shown comprises a segment 11 (Fig. 6) which is rigid with the cheese arm 8 and has a friction surface which is concentric with the axis of the cheese arm. A friction shoe 12 engages the periphery of the segment 11, said shoe having a rearwardly extending stem 13 which engages in a socket in the bracket 5, as indicated in Fig. 11. A cap screw 14 seated in the bracket 5 extends freely through an opening in the stem 13. A helically-coiled expansive spring 15 surrounds the screw 14 between the stem 13 and the head of the screw and serves to press the shoe 12 against the segment 11. The parts 11 and 12 constitute a friction brake. If there be at any time any incipient eccentricity causing the cheese to bound away from the cam drum 1, the friction brake retards the return of the cheese into contact with the drum after the high point has passed, the low point being gradually built up until the eccentricity has been corrected.

Means is provided for pressing the cheese against the drum 1. Herein is shown a curved link 16 pivoted at one end to the cheese arm 8 at 17 and connected at its other end to a helically-coiled contractile spring 18 which is anchored to a bar 19 extending along the longitudinal center of the machine.

The means for automatically removing the cheese from the cam drum 1 when the yarn exhausts, comprises a link 25 connected at its upper end to the cheese arm 8 in a manner to be hereinafter described. The lower end of the link 25 is formed into an elongated loop 27 (Fig. 3) and a forwardly extending arm 28. To the forward end of the arm 28 is attached a weight 29. As indicated in Fig. 6, gravity tends to swing the link 25 rearwardly so as to bring the lower end of the loop 27 within reach of a hook 30 fixed to a constantly rocking shaft 31 extending along the longitudinal center of the machine. The shaft 31 may be driven in any desired way, as, for example, by means of the mechanism shown in Fig. 4. 32 is a crank arm fixed to the shaft 31 and adjustably connected by means of a connecting rod 33 to a wrist pin 34 on a spur gear 35. The gear wheel 35 is driven from a pinion on one of the cam drum shafts 2 by means of the gear train 36. As indicated in Fig. 4, the connecting rod 33 is adjustable in length, and the point of pivotal connection of the connecting rod to the crank arm 32 may be adjusted toward and away from the axis of the shaft 31, thus providing for adjustment of the time of engagement of the hook 30 with the link 25 and adjustment of the extent of movement imparted by the hook to the link. When a link 25 is engaged by the corresponding hook 30, the cheese arm 8 to which said link is connected is swung upwardly to lift the cheese off the cam drum.

The means for normally keeping the loop 27 out of the range of action of the hook 30 comprises an element 37 (Fig. 6) in the nature of a slide, said element being formed of wire bent to provide two parallel rods 38 and 39 located one above the other. The rear end portion of the upper rod 38 extends at one side of one branch of the loop 27 (Figs. 3 and 5). The rear end portion of the lower rod 39 is bent to provide an open loop 40 which embraces the above-mentioned branch of the loop 27. Thus, the slide 37 is connected to move with the link 25. The slide 37 is guided in its movements in slots 41 (Figs. 3 and 6) formed in two parallel bars 42 extending longitudinally of the machine frame. The slides 37 are held against upward displacement in the slots 41 by means of bars 43 that overlie the bars 42 and are disengageably secured to the latter by means of springs clips 44.

The wire of which the element 37 is formed is bent to provide two detector fingers 45 (Figs. 7 and 10) which are connected by means of the integral curved portion 46. In operation, the weight 29 keeps the detector fingers 45 pressed against the running thread. The thread is supported against the pressure of the detector fingers by means such as a grid consisting of a plurality of fingers 47. Herein three fingers 47 (Fig. 10) are shown, the upper and lower fingers being connected by means of the integral curved portion 48. The fingers 47 are attached to a stationary structure 49 which may also support a yarn clearer (not shown). As shown in Fig. 5, the upper and lower fingers 47 extend to the right of the operator beyond the detector fingers 45 and are suitably curved so as to constitute guides for guiding a new thread into position between the detector fingers 45 and the grid.

Below the detector device just described is a thread-guiding means comprising, in the present instance, a plate 50 (Figs. 5 and 7) having thread-guiding edges 51 and 52; a plate 53 (see the lower part of Fig. 5) overlying the plate 50 and having a thread-guiding edge 54 and a thread-receiving notch 55; and a plate 56 overlying the plate 53. The edge 57 of the plate 56 defines one side of the throatway or passage through which a new thread moves while passing into operative relation to the detector mechanism, the edge 58 of the next adjacent plate 56 forming the opposite side of said throatway. 52, 54 and 58 may be termed entrance guide edges. The edge 59 of the plate 56 extends rearwardly beyond the vertical plane of the edge 54 of the plate 53, as best shown in Fig. 13. The rear end wall of the notch 55 is approximately in the same vertical plane as the edge 59. It will be seen that after the thread has entered the notch 55, it will be restrained from moving laterally out of the notch.

It will be apparent from Fig. 5 that the grid fingers 47 and the guide 58 opposite said fingers constitute a flaring entrance for the thread.

Means is provided for preventing the cheese from dropping back upon the cam drum after having been lifted by the hook 30. Said means comprises, in this instance, a bell-crank lever 60 (Fig. 6) pivoted at 61 to a rearward extension 62 of the cheese arm 8. The throw-out link 25 is pivoted to the lever 60 at 63. The upper arm of the lever 60 has a lug 64 adapted to enter a notch 65 in a lug 65ª on the bracket 5. The lower arm of the lever 60 is connected through the medium of a helically-coiled contractile spring 66 with a lever 67 which is pivoted to the extension 62 on the axis 61 (Fig. 17). On the lever 67 is a lug 68 (Figs. 14 and 17) adapted to bear against a lug 69 on the cheese arm 8. While the cheese is running on the cam drum, (as in Fig. 6), the spring 66 holds the lug 68 against the lug 69 and keeps the upper arm of the lever 60 against the hub of the cheese arm 8.

Assuming the parts to be in the position shown in full lines in Fig. 6: If the thread breaks or the bobbin becomes fully unwound, the weight 29 causes the link 25 to swing rearwardly within reach of the hook 30; the downward pull of the hook 30 causes the lever 60 to swing against the notched lug 65ª, the cheese arm rising and the lug 64 slipping into the notch 65 as the hook 30 continues to pull. When the hook 30 swings upwardly the lug 64 is detained in the notch 65 and the cheese arm held up with the cheese out of contact with the drum (see Fig. 13ª). The upward movement of the cheese arm and the consequent movement of the lug 69 allowed the lever 67 to move under the influence of the spring 66 until a lug 70 on said lever 67 bore against the link 25. As soon as the hook 30 has moved upwardly enough to release the loop 27, the spring 66, acting through the lever 67, swings the link 25 forward against a stop 71 (Fig. 12), whereby the loop 27 is withdrawn from the range of action of the hook 30, and the detector fingers 45 are moved into position for the introduction of a pieced-up thread. (See Figs. 12 and 13.)

When the cheese was thrown out of operation as just described, its rotation was checked by a friction plate 72, the forward end of which rests upon the cheese. The rear portion of the plate 72 is pivotally supported on the axis 17 by means of two perforated ears 73, one of which may be seen in Fig. 17. The plate 72 projects rearwardly of the axis 17 and thus constitutes a two-arm lever. A latch plate 74 is pivoted upon the axis 17 by means of perforated ears 75. The latch plate 74 is loosely connected to the rear arm of the lever or plate 72 by means of a bolt 76 (Fig. 16). Until the cheese has attained full size, the lever 72 supports the latch plate 74 above the path of oscillation of the upper arm of the lever 60 on the pivot 61, so that whenever the cheese is thrown out prior to the time it has attained full growth, the latch plate 74 is held up so as not to interfere with pivotal movement of the lever 60.

When a cheese which has not reached full size is thrown out of operation as hereinbefore described, the operative pieces up the broken thread or replaces the spent bobbin with a full bobbin, tying the end of the thread on the fresh bobbin to the end of the thread on the cheese, placing the pieced-up thread in the throatway between the guide plates 56 (Fig. 5), and rotating the cheese by hand to take up the slack and draw the new thread into the detector and into the notch 55. She then lifts the cheese arm a trifle to allow the spring 66 to swing the lever 60 to withdraw the lug 64 from the notch 65, the latch plate 74 being held up by the plate 72 out of position to interfere with such movement of the lever 60. The operative then lowers the cheese arm until the cheese is in contact with the drum 1, meanwhile holding the new thread under tension to prevent the formation of kinks. As the cheese arm is being lowered, the lug 69 (Fig. 6) withdraws the lever 67 from engagement with the link 25, whereupon gravity swings said link rearwardly into normal position, as shown in full lines in Fig. 6, thus placing the detector fingers 45 against the new thread, as in Figs. 6 and 10.

As indicated in Fig. 12, the plate 72 serves as a gage for the cheese, preventing a full cheese from being returned into engagement with the drum. The parts are so proportioned that when a full cheese is automatically thrown out of operation, as shown in Fig. 12, the rear edge of the latch plate 74 drops in front of the upper arm of the bell crank lever 60, and thus prevents the spring 66 from turning the lever 60 on its axis 61, thereby preventing the operative from lowering the cheese arm. The operative therefore replaces the full cheese with a cheese core $b$, the incidental downward movement of the plate 72 withdrawing the latch plate 74 upwardly so that after the bobbin has been tied on, the cheese arm may be restored to running position.

When a winding unit is not to be used, the cheese arm is swung upwardly until the point 17 has passed to the opposite side of the axis of the cheese arm, whereupon the spring 18 serves to hold the cheese arm elevated, a lug 77 (Fig. 15) on the cheese arm stopping against a portion of the bracket 5. In this position of the cheese arm, the upper end of the link 25 is so far forward that the lower portion of said link, fulcruming on the stop 71, is held up out of reach of the hook 30.

It will be understood that certain features of this invention are not limited to use in winders of the type disclosed in the beforementioned Colman patent, and that various changes may be made without departing from the invention defined in the appended claims.

I claim as my invention:

1. A winder having, in combination, a cheese arm having an extension rearwardly of its pivot, a bell crank mounted on said extension, a throw-out link pivoted to said bell crank for swinging said bell crank in one direction, a lever pivoted on said extension, and a tension spring connecting said lever to the bell crank for moving the latter in opposition to the throw-out link, said lever having a lug adapted to be moved into engagement with said link through the action of said spring, said cheese arm having a lug adapted to engage said lever for normally holding the first mentioned lug out of engagement with said link.

2. A winder having, in combination, a cheese arm having an extension rearwardly of its pivot, a bell crank mounted on said extension, a throw-out member connected to said bell crank for swinging said bell crank in one direction, a lever pivoted on said extension, a tension spring connecting said lever to the bell crank for moving the latter in opposition to the throw-out member, said lever having a lug adapted to be moved into engagement with said member through the action of said spring, and means for normally holding said lever out of engagement with said member.

3. A winder having, in combination, a pivoted cheese arm having an extension rearwardly of its pivot, a bell crank pivoted on said extension, throw-out means for swinging the cheese arm upwardly and said bell crank downwardly, said throw-out means being connected to said bell crank, a spring tending to move said bell crank in opposition to the throw-out means, and a fixed member arranged to be engaged by said bell crank while the latter is under the influence of said throw-out means to prevent upward movement of said bell crank.

4. A winder having, in combination, a rotary drum, a cheese arm pivoted rearwardly and above said drum, a pivot on said cheese arm between the ends of the latter for supporting a yarn carrier in position to rest upon the drum, the forward end of said cheese arm constituting a handle for raising and lowering the cheese arm, means for automatically swinging the cheese arm upwardly upon exhaustion of the thread being wound, and means for holding the cheese arm in elevated position.

5. A winder having, in combination, a rotary drum, a pivoted cheese arm for supporting a cheese upon the drum, said arm having a rearward extension, a lever pivoted on said extension, means connected to said lever for swinging the cheese arm to lift the cheese from the drum, a fixed member arranged to be engaged by said lever to hold the cheese arm elevated, and means to prevent disengagement of the lever from said fixed member.

6. A winder having, in combination, a rotary drum, a pivoted cheese arm for supporting a cheese upon the drum, means to swing the cheese arm to lift the cheese from the drum, means to hold the cheese arm elevated including a fixed member and a detent pivoted on the cheese arm and arranged to engage said fixed member, a latch member to prevent the detent from being disengaged from the fixed member, and a member carried by the cheese arm in position to rest upon the periphery of the cheese for controlling said latch member.

7. A winder having, in combination, a rotary drum, a pivoted cheese arm for supporting a cheese upon the drum, means to hold the cheese arm elevated with the cheese out of contact with the drum, a latch member to prevent release of the holding means, and a member carried by the cheese arm in position to rest upon the periphery of the cheese for controlling said latch member.

8. A winder having, in combination, a rotary drum, a pivoted cheese arm for supporting a cheese upon the drum, means to swing the cheese arm to lift the cheese from the drum, means to hold the cheese arm elevated, a latch member to prevent release of the holding means, and a member carried by the cheese arm in position to rest upon the periphery of the cheese for controlling said latch member.

9. A winder having, in combination, a rotary drum, a cheese arm pivoted above and rearwardly of said drum and adapted to support a yarn mass upon the drum, a curved link pivoted to the cheese arm, and a tension spring connected to said link and serving to hold the cheese arm elevated when the latter is lifted to shift the point of connection of the link to the cheese arm over center with reference to the axis of the cheese arm and the anchorage of the spring.

10. A winder having, in combination, a rotary drum, a pivoted cheese arm for supporting a cheese upon the drum, and a friction plate carried by the cheese arm in position to rest upon the periphery of the cheese and thus check the rotation of the cheese when the cheese arm is moved to withdraw the cheese from the drum.

11. A winder having a detector comprising stationary grid fingers and a detector comprising a finger adapted to pass through the space between the grid fingers, the grid fingers being connected together and extended past the end of the detector finger to serve as a guide for an entering thread.

12. A winder having a detector comprising a stationary grid consisting of three fingers and a detector consisting of two fingers adapted to pass through the spaces between the grid fingers, the detector fingers being connected together at their free ends, and the two outer grid fingers being connected together and extended past the ends of the detector fingers to serve as a guide for an entering thread.

13. A winder having, in combination, a throw-out link, a reciprocatory member to engage said link, a slide connected at its inner end with said link, a detector finger at the other end of said slide, and a stationary part coacting with said detector finger to support a running thread and thereby hold the link out of reach of said hook.

14. A winder having, in combination, a throw-out link, an oscillatory hook to engage said link, a slide connected at its inner end with said link, a detector finger at the other end of said slide, and a stationary grid coacting with said detector finger to support a running thread and thereby hold the link out of reach of said hook.

15. A high-speed winder having, in combination, a rotary drum, a cheese arm for supporting a cheese in peripheral contact with the drum, a brake segment connected to and concentric with the cheese arm, and a brake shoe yieldingly pressed against said segment to check bounding of the cheese upon the drum.

16. A winder having a thread guide structure comprising a plate having an entrance guide edge, a second plate having an entrance guide edge and a notch for the running thread, and a third plate having an entrance guide edge, and a guide edge for the running thread, the third plate being above and in front of the second plate, and the first and third mentioned entrance guide edges forming between them a passageway for the thread, the guide edge for the running thread being approximately in line with the rear end wall of the notch and rearwardly of the second mentioned entrance guide edge.

17. A winder having, in combination, a rotary cam drum, a bracket above and behind the drum, said bracket having at its lower end two sockets, a cheese arm adapted to support a cheese on said drum and having trunnions lying in said sockets, a handle on the lower end of said cheese arm, and spring means operating on said arm adjacent to said trunnions for yieldingly pressing the cheese against the drum.

18. A winder having, in combination, a rotary drum, a cheese-supporting member movable to carry the cheese into and out of contact with the drum, and means, including a feeler mounted on said member in contact with the periphery of the cheese, to lock said member against return after it has been withdrawn from the drum.

19. A winder having, in combination, a cheese arm having an extension rearwardly of its pivot, a lever mounted on said extension, a throw-out link pivoted to one arm of said lever for swinging said lever in one direction, a second lever pivoted on said extension, and a tension spring connecting the second lever to the other arm of the first lever for moving the latter in opposition to the throw-out link.

20. A winder having, in combination, a cheese arm having an extension rearwardly of its pivot, a lever mounted on said extension, a throw-out member connected to one arm of said lever for swinging said lever in one direction, a second lever pivoted on said extension, a tension spring connecting the second lever to the other arm of the first lever for moving the latter in opposition to the throw-out member, the second lever being adapted to be moved into engagement with said member through the action of said spring, and means for normally holding the second lever out of engagement with said member.

21. A winder having a detector comprising stationary grid fingers and a detector comprising a finger adapted to pass through the space between the grid fingers, the grid fingers being extended past the end of the detector finger, and a guide opposite said grid fingers, said guide and grid fingers forming a flaring entrance for a thread.

22. A winder having, in combination, a rotary drum, a pivoted cheese arm for supporting a cheese upon the drum, said arm having a rearward extension, a lever pivoted on said extension, means connected to said lever for swinging the cheese arm to lift the cheese from the drum, and a fixed member arranged to be engaged by said lever to hold the cheese arm elevated.

23. A winder having, in combination, a rotary drum, a pivoted cheese arm for supporting a cheese upon the drum, means to swing the cheese arm to lift the cheese from the drum, releasable means to hold the cheese arm elevated, a latch member to prevent the holding means from being released, and a member in position to engage the periphery of a full cheese for controlling said latch member.

24. A winder having a thread guide structure comprising a guide having a guide edge, a second guide having a guide edge and a notch for the running thread, and a third guide having an entrance guide edge and a guide edge for the running thread, the last mentioned guide edge being approximately in line with the rear end wall of said notch and rearwardly of the second mentioned guide edge.

25. A winder having, in combination, two parallel shafts, cam drums on said shafts, a beam midway between and above said shafts, and cheese arms pivoted to opposite sides of said beam and extending downwardly into position to support cheese on said drums, each of said arms having a handle at its lower end.

26. In a winder, winding means, means to throw out the winding means, a slide connected at one end with the throw-out means and having a detector at its other end, and means for automatically placing the slide in thread-receiving position upon actuation of the throw-out means.

27. In a winder, a pivotally-suspended throw-out link, a slide having at one end a detector and at the other end a slidable connection with the lower portion of the link, and devices for pivotally moving the link in opposite directions and for moving the slide into and out of thread-receiving position.

28. In a winder, the combination of a throw-out link, a reciprocatory member for operating the link, means connected to the link and tending to move the link into reach of said member, a detector attached to the link and normally holding the link out of reach of said member, and means acting on the link for disengaging the link from said member and placing the detector in thread-receiving position.

29. In a winder, the combination of a throw-out link, a reciprocatory member for operating the link, means connected to the link and tending to move the link into reach of said member, a slide connected at one end to said link and having at its other end a detector which normally holds the link out of reach of said member, and means for disengaging the link from said member and for moving the slide to place the detector in thread-receiving position.

In testimony whereof, I have hereunto affixed my signature.

BURT A. PETERSON.